June 24, 1958 — G. J. KEYKO — 2,839,842
EDUCATIONAL BLOCK ASSEMBLAGE
Filed Feb. 14, 1955
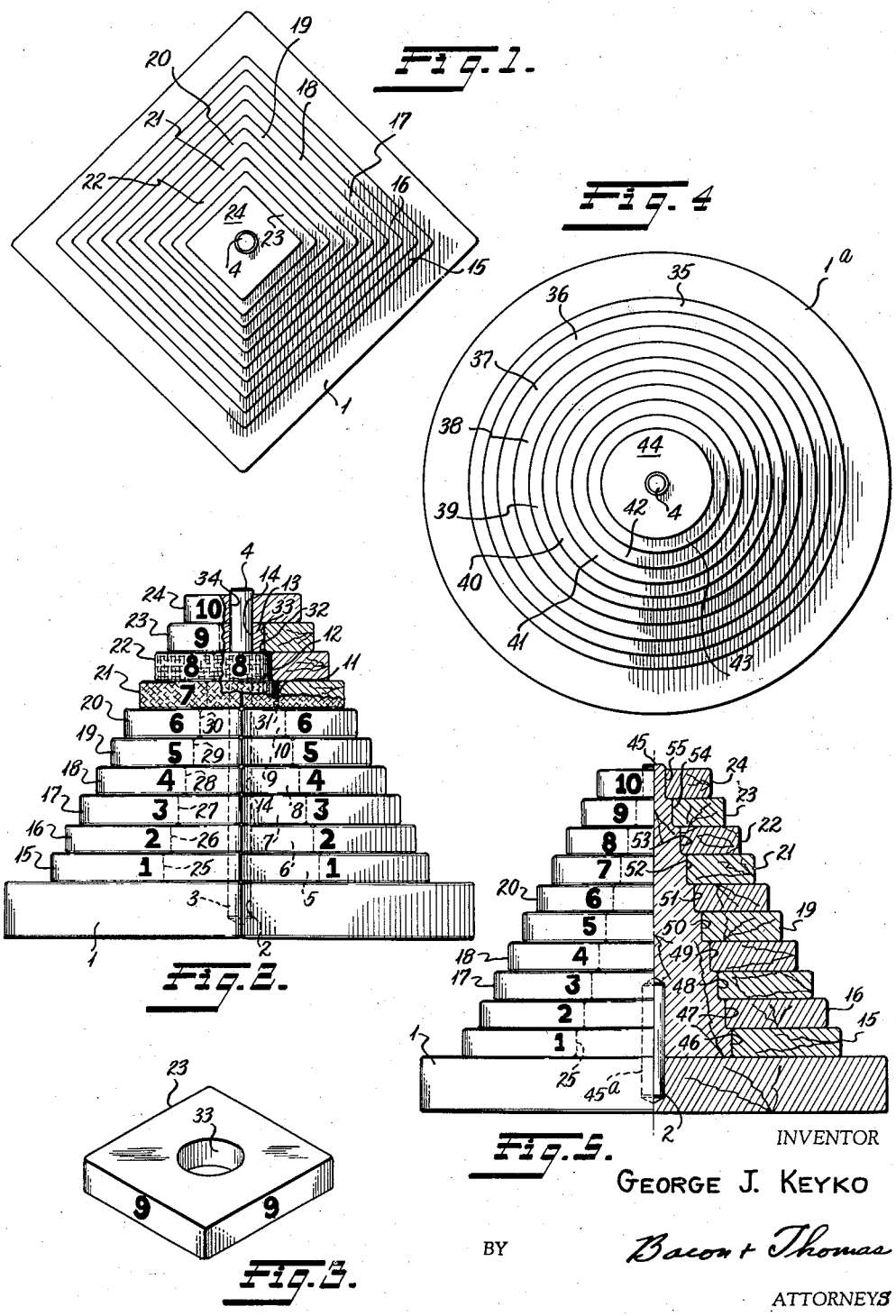
INVENTOR
GEORGE J. KEYKO
BY Bacon + Thomas
ATTORNEYS

United States Patent Office 2,839,842
Patented June 24, 1958

2,839,842

EDUCATIONAL BLOCK ASSEMBLAGE

George J. Keyko, Watertown, Conn., assignor to Teacher Toys, Inc., Hartford, Conn., a corporation of Connecticut Application February 14, 1955, Serial No. 487,827

8 Claims. (Cl. 35—22)

This invention relates generally to toys, and, more particularly, to a type of toy adapted for use by young children of pre-school age.

More specifically, the present invention relates to a toy comprising, in one embodiment thereof, a base having a central post of uniform diameter mounted thereon and two sets of complementary blocks, an inner set consisting of individual blocks of different size but all having a central opening of a diameter slightly larger than that of said post and adapted to be mounted upon said post to form a central body of stepped construction and an outer set consisting of individual blocks of different size and having a central opening of a size to receive one of the blocks of the inner set. Each of the blocks of the outer set has a thickness corresponding to that of its associated block of the inner set.

In another embodiment of the invention, the post and inner set of blocks may consist of a central stepped body of integral construction, and a so-called outer set of individual blocks of different size and having a central opening of a size to be received upon one of the steps of the central body, each block having a thickness corresponding to the height of its associated step.

In both forms of the invention, the outer sets of blocks may each be of a different color, and the block or step associated therewith may be of a corresponding color. The blocks of the outer sets may also have a circular, square or any other outer peripheral configuration, and this is also true of the inner set of blocks and/or stepped post forming the central body, but, in any event, the central openings in the outer blocks have a corresponding contour. Thus, a child can learn to correctly stack the blocks through proper coordination of their size, contour and color. Each of the outer blocks may also have a number on the peripheral edge thereof, and its associated block or step may have a corresponding number to teach correct association by coordination of numbers. These numerals may also be used to teach or enable a child to learn elementary addition and subtraction, as will be explained more fully hereinafter.

The principal object of the invention is to provide toys for young children which, by their nature, design and modes of use, are entertaining as well as instructive.

Another object is to provide toys which will serve to develop or to test the user's talents in the mental comparison and contrast of sizes, colors, numbers and/or the physical coordination of objects of given peripheral contour with corresponding apertures.

A further object is to provide toys which will serve as a means for teaching elementary addition and subtraction.

A further object is to provide toys which are attractive and compact when assembled and which can be readily displayed, stored, packaged or shipped.

A further object is to provide toys whose component parts are sturdy and safe for a small child to use and are easy to clean.

A still further object is to provide toys which may be readily and economically manufactured and which will endure a maximum of wear and rough handling.

Other objects, features and advantages of the invention will be apparent from the following description taken in conjunction with the accompanying drawings, in which:

Fig. 1 is a top plan view of one form of toy employing the principles of the present invention;

Fig. 2 is a side elevational view of the toy shown in Fig. 1 having a portion thereof broken away;

Fig. 3 is a perspective view of a component outer block of the toy shown in Figs. 1 and 2;

Fig. 4 is a top plan view of another form of toy embodying the invention; and

Fig. 5 is a view partly in side elevation and partly in cross section of still another form of toy embodying the invention.

Referring now in detail to the drawings, and particularly to Figs. 1, 2 and 3 thereof, the toy comprises a preferably square base member 1 having a socket 2 in the center of its upper surface for the reception of the lower extremity 3 of a vertical post 4. The extremity 3 may be removably received within the socket 2 with or without securing means such as screw threads (not shown), or it may be permanently secured therein by means of a fastening element, force-fitting, gluing or the like.

A set of disc-shaped inner blocks comprising the blocks 5, 6, 7, 8, 9, 10, 11, 12, and 13 are provided, each being preferably of the same thickness but being successively smaller in diameter ranging preferably from a maximum diameter (that of block 5), which is less than one-half the length of one side of the base member 1, to a minimum diameter (block 13) which is less than one-half the size of the maximum diameter. While the blocks 5 to 13 are shown as circular, it will be understood that they may be made square or have any other desired geometric configuration.

Openings 14 extend through the centers of disc-shaped blocks 5–13, said openings being of such a size and configuration as to readily accommodate the post 4. The blocks 5–13 are thereby adapted to be placed over the post 4 and stacked upon the base member 1 in the order of decreasing size.

A second set of blocks, consisting of individual square outer blocks 15–23 is provided, each of the blocks being of the same thickness and corresponding to the thickness of their associated inner blocks 5–13. The blocks 15 to 23 are successively smaller in area, ranging in the length of their sides from a maximum (in block 15) nearly approaching the length of a side of the base member 1 to a minimum (in block 23), which is less than one-third that size.

The block 15 is provided with an opening 25 having a size and configuration which conform to the outer periphery of the block 5, thereby allowing the block 15 to be placed on the base member 1 in surrounding telescopic relation to the inner block 5. Similarly block 16 is provided with an opening 26 conforming to the outer periphery of block 6; block 17 is provided with an opening 27 conforming to the outer periphery of block 7; block 18 is provided with an opening 28 conforming to the outer periphery of block 8; block 19 is provided with an opening 29 conforming to the outer periphery of block 9; block 20 is provided with an opening 30 conforming to the outer periphery of block 10; block 21 is provided with an opening 31 conforming to the outer periphery of block 11; block 22 is provided with an opening 32 conforming to the outer periphery of block 12; and block 23 is provided with an opening 33 conforming to the outer periphery of block 13. The block 23 with its central opening is shown in perspective in Fig. 3.

The uppermost block 24 is provided with an opening 34 conforming to the outer periphery of post 4, but as will be understood that it may be telescopically mounted upon an inner block (not shown) received upon the post 4 and of smaller size than the block 13.

It will be readily seen that a child, when provided with the disassembled device, may first stack the inner set of blocks 5–13 on the base member 1 in the proper order, thus forming a central generally conical body having stepped portions of ascending smaller size. The child then may proceed to stack the corresponding outer blocks 15 to 23 on said body, topping the assemblage with the block 24. As an aid in assisting the child in properly stacking the outer set of blocks on the inner set of blocks, the corresponding inner and outer blocks preferably have the same color. Thus, as shown in Fig. 2, blocks 21 and 11 may be painted, or otherwise colored, orange, blocks 22 and 12 may be painted, or otherwise colored, yellow, and so on.

Moreover, numerals may be provided, preferably on the outer peripheries of either the inner or the outer set of blocks, or on the outer peripheries of both sets. Thus, as illustrated in Fig. 2, the outer blocks 15 to 24 are provided on each side thereof with the numbers "1" to "10." Similarly, the inner blocks 5 to 13 are provided with the corresponding numerals "1" to "9"; the number "8" only being visible upon block 12. These furnish the child with a visual aid for coordinating corresponding blocks, learning to count, from 1 to 10, and as a basis for learning to add and subtract. With respect to the latter, for example, when the child stacks the two lowermost blocks and then adds the next four blocks in the appropriate order, he will then see the numeral "6" on the uppermost block, signifying that two plus four equals six. Again, if the child should then remove the two uppermost blocks the uppermost remaining block bears the numeral "4" thus indicating that 6 minus 2 equals 4.

It will readily be seen that the size and shape of the component parts of the toy may vary substantially without departing from the spirit of the invention. For example, the modified form of the invention shown in Fig. 4 comprises the same post 4 and disc-shaped inner blocks (not shown) as disclosed in the form previously described. However, in this form, a round base member 1a and a set of round outer blocks 35, 36, 37, 38, 39, 40, 41, 42, 43 and 44 are employed, said base being provided with a socket (not shown) corresponding to socket 2 and said set of outer blocks being provided with openings (not shown) similar to openings 25–34 in the blocks 15–24. The inner and outer sets of blocks may be colored, numbered, and assembled in the same manner as described in connection with the form of the invention shown in Figs. 1 to 3.

Another form of the invention is shown in Fig. 5. In this instance, a generally conical stepped body or post 45 is suitably secured to the base member 1 by a dowel 45a, and provides an integral body having stepped portions 46, 47, 48, 49, 50, 51, 52, 53, 54 and 55, whose outer peripheries conform respectively in size and configuration (circular, square, etc.) to the openings 25–34 in the corresponding blocks 15–24 previously described as the outer set of blocks. The stepped portions 46–55 are each of a height corresponding to its associated block.

The blocks 15–24 may, therefore, be stacked upon the base member 1, each being telescopically received on the appropriate step portion of the body 45. For example, the block 15, having the opening 25, which conforms to the outer periphery of step portion 46, may be telescopically received on said step portion with the lower surface of said block resting on the base member 1. Similarly, the block 16 may be received on step portion 47, the block 17 on step portion 48, and so on.

This last mentioned form of the invention is especially suitable for very young children whose minds may more easily grasp the principle of the total device due to the face that fewer blocks are involved.

The use of numerals, corresponding colors, etc., described in connection with the first described forms of the invention are equally adaptable to the last.

It will thus be seen that the invention described herein in several of its forms is well adapted to attain those objectives stated heretofore and those implicit in the above description.

It will be understood that numerous changes and modifications in form, structure, external appearance and configuration of the toys disclosed may be made without departing from the principles of the invention or the scope of the annexed claims.

I claim:

1. A toy, comprising: a base member; a rigid post extending vertically from said base member; a single inner set of blocks, each of said blocks being of successively decreasing size and having an opening of the same size therein slightly larger than the periphery of said post to allow said blocks to be stacked in predetermined order on said post to form a rigid central body of stepped formation with the largest block engaging said base member; and a single outer set of blocks, each of said last-mentioned blocks having an opening corresponding in size and configuration to the outer periphery of the corresponding block of said inner set, whereby said outer set of blocks can be stacked only in predetermined order on said base member in telescoping relation to said inner set of blocks.

2. The toy of claim 1, wherein the blocks of said inner set vary in color and wherein each of the blocks of said outer set are of a color which corresponds to the color of the corresponding inner block about which said outer block is adapted to be telescopically received.

3. A toy, comprising: a base member; a rigid post extending vertically from said base member; a single inner set of blocks of successively decreasing diameters, each of said blocks having an opening therein of the same size and slightly larger than the periphery of said post to allow said blocks to be stacked in predetermined order on said post to form a rigid central body of stepped formation with the largest block engaging said base member; and a single outer set of blocks, each of said last-mentioned blocks having a circular opening corresponding in size to the outer periphery of the corresponding block in said inner set, whereby said outer set of blocks can be stacked only in a predetermined order on said base member in telescoping relation to said inner set of blocks.

4. A toy, comprising: a base member; a rigid post extending vertically from said base member; a single inner set of blocks of successively decreasing sizes, each of said blocks having an opening therein of the same size and slightly larger than the periphery of said post to allow said blocks to be stacked in predetermined order on said post to form a rigid central body of stepped formation with the largest block engaging said base member; and a single outer set of blocks of successively decreasing sizes, each of said last-mentioned blocks having an opening corresponding in size and configuration to the outer periphery of the corresponding block of said inner set, whereby said outer set of blocks can be stacked only in a predetermined order on said base member in telescoping relation to said inner set of blocks.

5. The toy of claim 4 wherein the lowermost of said blocks of said outer set is provided with a numeral reproduced thereon and each successively smaller block in said outer set is in turn similarly provided with the next consecutively larger numeral.

6. A toy, comprising: a base member; a rigid stepped post extending vertically from said base member, said post having steps which successively increase in size at their outer periphery from the top toward the bottom of said post; and block members each having a thickness approximating the height of a corresponding step portion of said post and each having an opening therein conforming in size and configuration to the outer periphery of the corresponding step portion, whereby one of said blocks is adapted to be placed telescopically around the lowermost of said step portions with the lower surface of said one block resting on said base member and whereby the remaining blocks are adapted to be stacked thereabove in only a predetermined order, each being placed telescopically around each succeeding step portion of said post.

7. A toy, comprising: a square base member; a rigid round stepped post secured to said base member; and square block members of successively decreasing sizes each having a thickness approximating the height of a corresponding step portion of said post and each having an opening therein conforming in size and configuration to the outer periphery of the corresponding step portion, whereby one of said blocks is adapted to be placed telescopically around the lowermost of said step portions with the lower surface of said one block resting on said base member and whereby the remaining blocks are adapted to be stacked thereabove, each being placed telescopically around each succeeding step portion of said post.

8. A toy, comprising: a base member; means on said base member providing thereabove a rigid central body having a series of step portions successively decreasing in size in a direction away from said base member; a set of block members, each of said block members having a thickness approximating the height of one of said step portions and having an opening therein conforming in size and configuration to a corresponding one of said step portions, whereby said set of block members may be stacked on said base member in only a predetermined order with each of said block members being telescopically received on the corresponding step portion of said body.

References Cited in the file of this patent

UNITED STATES PATENTS

| | | |
|---|---|---|
| 595,455 | Glidden | Dec. 14, 1897 |
| 983,730 | Leach | Feb. 7, 1911 |
| 2,493,697 | Raczkowski | Jan. 3, 1950 |

FOREIGN PATENTS

| | | |
|---|---|---|
| 904,153 | Germany | Feb. 15, 1954 |